(12) United States Patent
Kirihara (10) Patent No.: US 12,472,623 B2
(45) Date of Patent: Nov. 18, 2025

(54) ROBOT, DRIVE UNIT FOR A ROBOT AND POSITIONING METHOD

(71) Applicant: Schaeffler Technologies AG & Co. KG, Herzogenaurach (DE)

(72) Inventor: Daisuke Kirihara, Yokohama (JP)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 231 days.

(21) Appl. No.: 18/271,697

(22) PCT Filed: Nov. 26, 2021

(86) PCT No.: PCT/DE2021/100937
§ 371 (c)(1),
(2) Date: Jul. 11, 2023

(87) PCT Pub. No.: WO2022/148507
PCT Pub. Date: Jul. 14, 2022

(65) Prior Publication Data
US 2024/0058949 A1 Feb. 22, 2024

(30) Foreign Application Priority Data
Jan. 11, 2021 (DE) .......................... 102021100276.1

(51) Int. Cl.
*B25J 9/12* (2006.01)
(52) U.S. Cl.
CPC ....................... *B25J 9/12* (2013.01)
(58) Field of Classification Search
CPC .......................................................... B25J 9/12

USPC ............................................................. 74/640
See application file for complete search history.

(56) References Cited

U.S. PATENT DOCUMENTS

2018/0172080 A1    6/2018   Jackowski et al.

FOREIGN PATENT DOCUMENTS

| CN | 109366480 A | 2/2019 | |
| DE | 102011009669 | 12/2011 | |
| DE | 102015100676 | 6/2016 | |
| DE | 102018204338 | 9/2019 | |
| DE | 102018125078 | 4/2020 | |
| DE | 102018125079 | 4/2020 | |
| DE | 102018130970 | 6/2020 | |
| DE | 102019210795 | 1/2021 | |
| EP | 3623113 | 3/2020 | |
| EP | 4086585 A1 * | 11/2022 | ............. H02K 11/22 |
| JP | H1067524 | 3/1998 | |

(Continued)

*Primary Examiner* — T. Scott Fix
(74) *Attorney, Agent, or Firm* — Volpe Koenig (57) ABSTRACT

A drive unit for a robot, having an input shaft, an input shaft drive motor and a strain wave gear mechanism for transmission to an output shaft. The strain wave gear mechanism has a wave generator which is operatively connected to the input shaft, a flexible ring and a toothed ring are connectable to the output shaft, a first sensor for detecting an angular position of the input shaft and a second sensor for detecting the angular position of the output shaft. In order to allow the drive unit to precisely adjust the angular position of the output shaft to each setpoint angular position, the drive unit has a third sensor for detecting an expansion of the flexible ring. A robot having such a drive unit and a method for precisely adjusting the angular position of the output shaft are also provided.

13 Claims, 4 Drawing Sheets

(56) References Cited

FOREIGN PATENT DOCUMENTS

| | | |
|---|---|---|
| JP | 2010005730 A | 1/2010 |
| JP | 2014168899 | 9/2014 |
| JP | 2015032936 | 2/2015 |
| JP | 2017103951 A | 6/2017 |
| JP | 6334317 | 5/2018 |
| JP | 2020502964 A | 1/2020 |
| KR | 102061693 | 12/2019 |
| WO | 2018235812 A1 | 12/2018 |

\* cited by examiner

Fig. 8

ROBOT, DRIVE UNIT FOR A ROBOT AND POSITIONING METHOD

CROSS-REFERENCE TO RELATED APPLICATION

This application is the U.S. National Phase of PCT Appln. No. PCT/DE2021/100937, filed Nov. 26, 2021, which claims priority from German Patent Application No. 10 2021 100 276.1, filed Jan. 11, 2021, the entire disclosures of which are incorporated by reference herein.

TECHNICAL FIELD

The disclosure relates to a drive unit for a robot having a drive shaft, a drive motor for driving the drive shaft, and a strain wave gear mechanism for transmission from the drive shaft to an output shaft, wherein the strain wave gear mechanism has a wave generator operatively connected to the drive shaft, a flexible ring, and a toothed ring which can be connected to the output shaft, comprising a first sensor for detecting an angular position of the drive shaft and a second sensor for detecting an angular position of the output shaft. Furthermore, the disclosure relates to a robot having such a drive unit and a method for adjusting the angular position of the output shaft in such a drive unit.

BACKGROUND

Generic drive units are known from the prior art and are used in particular in robotics, for example to move robot arms used in industry, in laboratory technology, or in medical technology. For this purpose, the drive units are equipped with strain wave gear mechanisms to enable a very high transmission ratio between the drive motor and the part of the robot to be moved for precise movement of a robot arm. Strain wave gear mechanisms have a wave generator or wave maker, which has a non-round, in particular oval, cross-section and runs in a flexible ring, also called a flexspline, wherein the flexible ring is deformed all the way around. The flexible ring has an external toothing which engages in an internal toothing of a toothed ring designed as an outer ring only at the two outer points of its deformation. Due to the circumferential deformation, the engagement points also rotate, wherein the number of teeth of the flexible ring and that of the toothed ring differ, so that the toothed ring is set in a rotary motion that is significantly slower than the rotary motion of the wave generator.

The drive motor is adjusted by means of an adjustment process to move the output shaft to the desired angular position as precisely as possible. The first and second sensors serve as actual value generators, wherein the first sensor is used for coarse positioning and the second sensor is used for fine positioning. The first sensor does not offer sufficient precision and stability for fine positioning due to vibrations and force input when a load is applied on the output side. Electric motors are usually used as the drive motors and rotary encoders are used as the first and second sensors. Such a corresponding drive unit is known, for example, from KR 102061693 B1. Also known from JP 6334317 B is a drive unit having a sensor for detecting the expansion of the output shaft.

Disadvantageously, when the output shaft is moved, the flexible ring is expanded in the form of a torsion, particularly during acceleration, wherein the expansion is superimposed on the angular position transmitted from the drive shaft to the output shaft. In this respect, the second sensor is not suitable for sufficiently precise adjustment of the output shaft position, at least in the region of an angular distance over which the acceleration takes place, but shows measured values superimposed by the expansion, which lead to an overshooting of the angular position of the output shaft. In an angular range lying outside this angular distance, the second sensor is only suitable for precision adjustment of the angular position of the output shaft insofar as the continuous expansion of the flexible ring at the constant speed which follows acceleration is known.

SUMMARY

An object of the disclosure is to propose a drive unit in which the angular position of the output shaft can be precisely adjusted to any desired angular position. According to a first aspect of the disclosure, the object is achieved with a drive unit having one or more of the features disclosed herein. The object is also achieved according to a second aspect of the disclosure with a robot having one or more of the features disclosed herein. According to a third aspect of the disclosure, the object is also achieved by a method having one or more of the features disclosed herein. Advantageous refinements are presented below and in the claims.

Acceleration is understood to mean an acceleration of the drive motor, which is transmitted to the output shaft via the drive shaft and the strain wave gear mechanism. All components involved are accelerated here and, in particular, the flexible ring is expanded. In the following, speed is also understood to mean the respective speed of all components, wherein the drive shaft and the flexible ring have a higher speed than the output shaft, which corresponds to the transmission ratio of the strain wave gear mechanism.

According to the first aspect of the disclosure, the drive unit is characterized by a third sensor for detecting an expansion of the flexible ring. All variables that influence the position of the output shaft are known by means of the first, the second, and the third sensor, and adjustment methods based thereon can be used which lead to a precise positioning of the output shaft. Such a method can be an adjustment method, for example, in which the expansion detected by the third sensor is used directly as the actual value in addition to the position of the output shaft detected by the second sensor as the actual value. An adjustment method is preferred in which a calibration method is connected upstream and the information obtained therefrom is used during operation of the drive unit for adjustment with only the actual angular position of the output shaft as the actual value. Such a method is proposed below according to the second aspect of the disclosure.

The third sensor can be, for example, a sensor for detecting a position relative to a fixed part or a strain gauge.

According to a preferred embodiment of the disclosure, the flexible ring has a radially extending collar and the third sensor is arranged on the collar. In this way, the third sensor is advantageously arranged away from the region in which the flexible ring is in operative connection with the wave generator or in toothed engagement with the toothed ring. Furthermore, the expansion of the flexible ring can be reliably measured on a collar.

In a further preferred embodiment, the second sensor is arranged on the toothed ring. It is advantageously arranged on the first output-side element of the drive device in such a way that the position of the output shaft is detected directly at the transmission. Furthermore, the drive unit can advantageously be used with a second sensor arranged on the toothed ring with a large number of different add-on parts on the output side.

In a further preferred embodiment, the drive motor, the strain wave gear mechanism, and the first sensor are arranged to be coaxial to the drive shaft. A compact drive unit is created in this way.

The second aspect of the disclosure relates to a robot having a drive unit as described above. In particular, the robot is a robot arm for use in industry, in laboratory technology, or in medical technology. The robot accordingly has the advantages described above.

The third aspect of the disclosure relates to a method for adjusting the angular position of the output shaft during a positioning by means of the drive motor via the drive shaft and the strain wave gear mechanism in a drive unit as described above.

According to the disclosure, the method comprises a calibration method in which the angular distances of the drive shaft and the output shaft are determined by means of the first, the second, and the third sensor during an acceleration, about which there is a non-linear relationship between the angular position of the drive shaft and the angular position of the output shaft due to an elongation of the flexible ring. From the angular distances determined in this way, it is then known that the actual angular position of the output shaft can only be detected imprecisely by the second sensor during the acceleration, since the angular position is superimposed or falsified by an expansion of the flexible ring that cannot be precisely detected. This information can then be taken into account when positioning the output shaft. Precise control of a setpoint angular position, which lies within such an angular distance starting from the actual angular position, is not possible with the second sensor as the actual value generator, and requires a modified adjustment strategy.

The calibration procedure is only carried out once to detect all significant values. The calibration method is preferably carried out on a drive unit which is in the installation situation in which the positioning of the output shaft is subsequently to be carried out, i.e., under operating conditions. The influence of components attached to the drive unit and other environmental conditions is then also taken into account. The calibration method is preferably carried out again at regular time intervals and/or after a defined number of positioning processes.

In the calibration process, angular distances are detected on the one hand for the drive shaft and on the other hand for the output shaft. The angular distance of the drive shaft is related to the angular distance of the output shaft via the transmission ratio of the strain wave gear mechanism and the expansion of the flexible ring.

The calibration method is preferably carried out with a defined acceleration, which is also used exclusively in the following for positioning the output shaft, since the angular distance detected is specific to such an acceleration. Alternatively, it is also possible to interpolate or extrapolate further angular distances for further acceleration profiles from the information obtained.

Furthermore, according to the disclosure, the method comprises a positioning method for adjusting the angular position of the output shaft from an actual angular position to a target angular position using the second sensor as the actual value generator, wherein it is checked whether there is at least the determined angular distance of the output shaft between the actual angular position and the target angular position and, if this is not the case, the output shaft is rotated until the actual angular position is spaced apart from the target angular position by at least the determined angular distance of the output shaft, and then the actual angular position is adjusted to the target angular position by means of the second sensor. In this way, it is ensured that at no point in time must an adjustment be made in a set angular position that is within the angular range in which precise adjustment would not be possible. Advantageously, the expansion of the flexible ring does need not be continuously detected and processed in the adjustment. The positioning process is carried out for each new target angular position of the output shaft in the continuous operation of the drive unit.

In one embodiment, in addition to the second sensor, the first sensor is also used as an actual value generator, at least as an alternative. In particular, the first sensor is used to move the output shaft from the first actual angular position to an actual angular position that is spaced apart from the target angular position by at least the determined angular distance of the output shaft. In this way, this upstream positioning process is not subject to the restriction that it must be greater than the detected angular distance of the output shaft.

In a preferred embodiment of the method, an expansion of the flexible ring of 0% is first set in the calibration method and the angular position of the drive shaft is detected by the first sensor and the angular position of the output shaft by the second sensor as the first angular positions. The output shaft is then accelerated in a defined manner in a first direction of rotation to a first speed, wherein the angular position of the drive shaft is detected by the first sensor and the angular position of the output shaft is detected by the second sensor as second angular positions as soon as the third sensor detects continuous expansion of the flexible ring. The distance between the first detected angular position and the second detected angular position is then defined as codirectional angular distances. The term "codirectional" refers to a rotation relative to a previous rotation and is understood to mean that the rotation and the previous rotation are in the same direction. A codirectional angular distance is the angular distance within which precise adjustment using the second sensor as the actual value generator is not possible if the rotation to be adjusted was preceded by a rotation in the same direction.

In a further embodiment of this embodiment of the method, the output shaft is then stopped and the angular position of the drive shaft is detected by the first sensor and the angular position of the output shaft by the second sensor as third angular positions. The output shaft is then rotated in a second direction of rotation and stopped again as soon as the third sensor detects an expansion of the flexible ring of 0%, wherein at standstill the angular position of the drive shaft is detected by means of the first sensor and the angular position of the output shaft is detected by means of the second sensor as the fourth angular position. The output shaft is then accelerated in a defined manner in the second direction, wherein the angular position of the drive shaft is detected by the first sensor and the angular position of the output shaft is detected by the second sensor as the fifth angular position as soon as the third sensor detects an unchanged expansion of the flexible ring. The distance between the third detected angular position and the fifth detected angular position is then defined as opposite angular distances. The term "opposite" refers to a rotation relative to a previous rotation and is understood to mean that the rotation and the previous rotation are in opposite directions. A reverse angular range is the angular range within which precise adjustment using the second sensor as the actual value generator is not possible if the rotation to be adjusted was preceded by a rotation in the opposite direction.

The codirectional and opposite angular sections differ from one another in that, due to the usually very low spring constant of the flexible ring, a continuous expansion occurs in the flexible ring after acceleration, which is not resolved when the drive shaft is stationary again. This continuous expansion is therefore called residual expansion. If the flexible ring is first accelerated in the first direction and then in the second direction, the residual expansion from the first rotation must first be triggered as soon as the flexible ring is stretched by the acceleration in the second direction. For this reason, the codirectional angular distances, where the residual expansion in the corresponding direction already exists during acceleration, are shorter than the opposite angular distances, where the residual expansion from the previous rotation must first be triggered.

Advantageously, after detecting the codirectional and oppositely directed angular distances in the positioning method, the codirectional or oppositely directed angular distance of the output shaft can be used as a basis when checking the distance between the actual angular position and the target angular position, depending on the direction of rotation during a previous rotation of the output shaft. In this way, the shortest possible angular distance is always used as a basis for the check so that an unnecessary distance between the actual angular position and the target angular position is avoided.

In a further preferred embodiment of the method, the difference between the distance between the third detected angular position and the fourth detected angular position of the drive shaft, and the distance between the third detected angular position and the fourth detected angular position of the output shaft, normalized by the transmission ratio, is defined as the residual expansion. The residual expansion at the defined acceleration is then advantageously known and can be used to correct the measured values of the second sensor.

In a preferred embodiment, in the positioning method, the output shaft is rotated in the same direction of rotation as in an immediately preceding rotation to space apart the actual angular position from the target angular position by at least the determined angular distance. An additional change of direction is thus avoided. In particular, since a rough positioning is sufficient here, the first sensor can be used as an actual value generator for spacing apart the actual angular position from the setpoint angular position, and the measured values of the first sensor are not superimposed by any expansion of the flexible ring.

In a further preferred embodiment, in the positioning method, when checking the distance between the actual angular position and the target angular position, depending on the direction of rotation for a previous rotation of the output shaft, the codirectional or the opposite angular distance is taken as a basis. As already described above, the shortest possible angular distance is always used as a basis for the check, so that an unnecessary distance between the actual angular position and the setpoint angular position is avoided.

BRIEF DESCRIPTION OF THE DRAWINGS

Further measures to improve the disclosure are illustrated below together with the description of preferred exemplary embodiments of the disclosure using the figures. In the figures.

DETAILED DESCRIPTION

Figure 1:
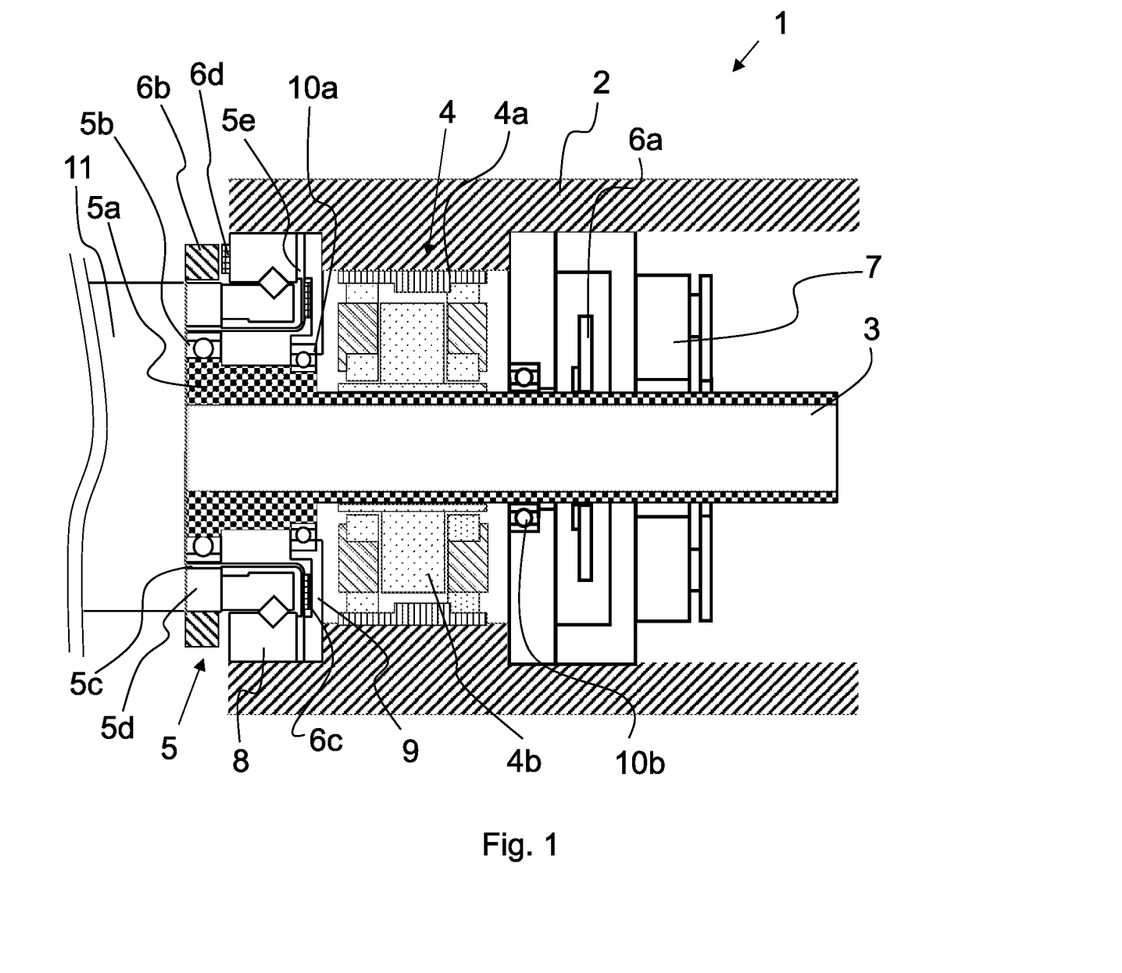
FIG. 1 shows a schematic cross-section of a drive unit according to the disclosure.

FIG. 1 shows a drive unit 1 having a housing 2 delimiting it on the outside. Within the housing 2, a drive shaft 3 is mounted by means of ball bearings 10a, 10b, which can be driven by a drive motor 4 with a stator 4a and a rotor 4b. Furthermore, a strain wave gear mechanism 5 is arranged on the drive shaft 3, which converts a rotational movement of the drive shaft 3 into a slower rotational movement of an output. The strain wave gear mechanism 5 has a high transmission ratio and rigidity. A first sensor 6a is also arranged on the drive shaft 3 and detects an angular position $\Theta_i$ of the drive shaft 3. The first sensor 6a is designed here as a rotary encoder. A brake 7 also acts on the drive shaft 3, by means of which the drive shaft 3 can be braked.

The strain wave gear mechanism 5 has a wave generator 5a, a flexible ring 5c mounted opposite the wave generator 5a by means of a ball bearing 5b, and a toothed ring 5d. The wave generator 5a is formed directly on the drive shaft 3, while the toothed ring 5d forms the output of the strain wave gear mechanism 5 and is connected or can be connected to an output shaft 11. A second sensor 6b is arranged on the toothed ring 5d, which sensor detects an angular position $\Theta_o$ of the toothed ring 5d, which is the angular position of the output shaft 11 at the same time. For this purpose, the second sensor 6b detects the angular position $\Theta_o$ of the toothed ring 5d in relation to a corresponding sensor part 6d on the stationary component 8 on the housing side. The flexible ring 5c has a collar 5e by means of which it is fixed to the housing 2. A third sensor 6c is arranged on the collar 5e, by means of which an expansion ω in the sense of a torsion of the flexible ring 5c is detected. For this purpose, a relative displacement of a measuring point on the flexible ring 5c in relation to the stationary component 9 on the housing side is detected.

Figure 2:
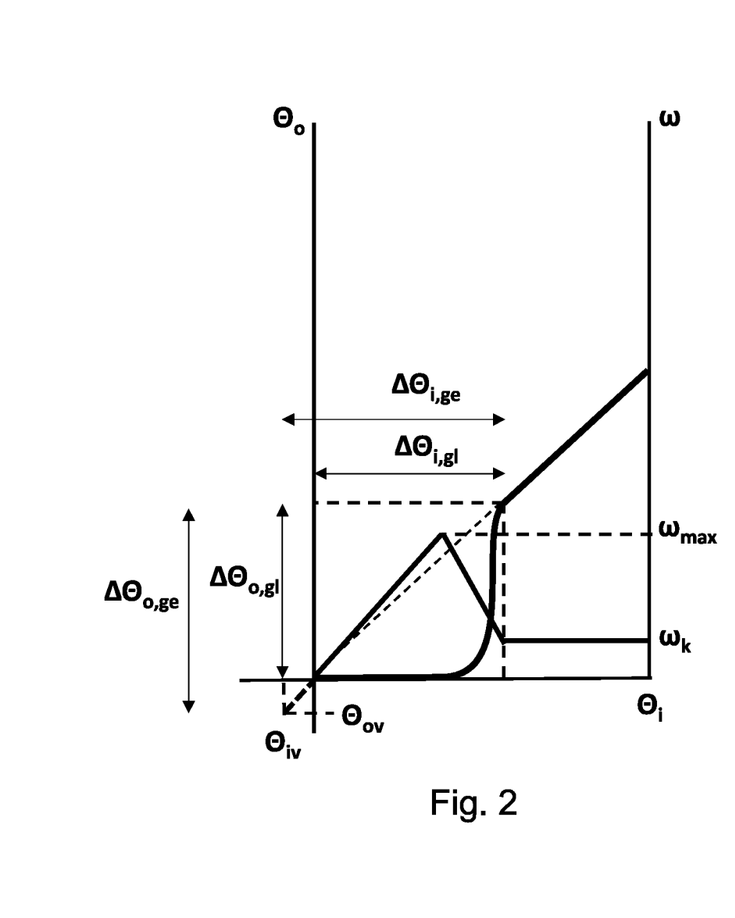
FIG. 2 shows a plot of output shaft angular position on the first y-axis versus drive shaft angular position on the x-axis and flex ring expansion on the second y-axis under acceleration.
Figure 3:
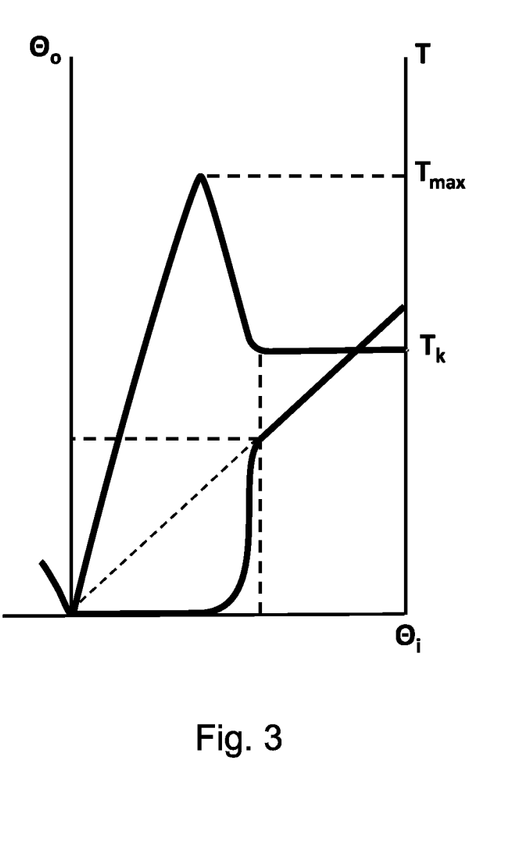
FIG. 3 shows a plot of output shaft angular position on the first y-axis versus drive shaft angular position on the x-axis, and torque in the flexible ring on the second y-axis under acceleration.

FIGS. 2 and 3 show the course of the angular position $\Theta_i$ of the drive shaft 3 and the angular position $\Theta_o$ of the output shaft 11 (or the toothed ring 5d) as well as the course of the expansion ω of the flexible ring in FIG. 2 and the course of the torque T in the flexible ring 5c in FIG. 3 during acceleration. The torque T or the expansion w in the flexible ring 5c builds up during the acceleration up to a maximum expansion $\omega_{max}$ and a maximum torque $T_{max}$, wherein the angular position $\Theta_o$ of the output shaft 11 does not yet change or the angular position $\Theta_i$ follows the drive shaft 3. If the acceleration reaches a constant target speed, the torque T or the resulting expansion w decreases until it reaches continuous values $\omega_k$ or $T_k$. Up to this point there is a non-linear relationship between the angular position $\Theta_i$ of the drive shaft 3 and the angular position $\Theta_o$ of the output shaft 11, which makes it impossible to precisely adjust a positioning of the output shaft 11 using only the values of the second sensor 6b as the actual value generator. From this point there is again a linear relationship between the angular position $\Theta_i$ of the drive shaft 3 and the angular position $\Theta_o$ of the output shaft 11. All of the angular positions $\Theta_o$ of the output shaft 11 lying therebehind can be adjusted by means of the second sensor 6b as an actual value generator.

In the case of codirectional acceleration, there is an angular distance $\Delta\Theta_{i,gl}$ of the drive shaft 3 between the zero point and the point at which $\omega_k$ or $T_k$ is reached, over which there is a non-linear relationship between the angular position $\Theta_i$ of the drive shaft and the angular position $\Theta_o$ of the output shaft 11 due to an expansion of the flexible ring 5c. For the output shaft 11, there is an angular distance $\Delta\Theta_{o,gl}$ between the zero point and the point at which $\omega_k$ or $T_k$ is reached, over which there is a non-linear relationship between the angular position of the drive shaft and the angular position of the output shaft 11 due to an expansion of the flexible ring 5c.

In the case of an opposite acceleration, the residual expansion, which corresponds to the continuous expansion $\omega_k$, must also be reduced from the previous rotation. This then results in an angular distance $\Delta\Theta_{i,ge}$ of the drive shaft 3 between the point $\Theta_{i,v}$ corresponding to the residual elongation and the point at which $\omega_k$ is reached, over which there is a non-linear relationship between the angular position $\Theta_i$ of the drive shaft 3 and the angular position $\Theta_o$ of the output shaft 11 due to an expansion of the flexible ring 5c. For the output shaft 11, there is an angular distance $\Delta\Theta_{o,ge}$ between the point $\Theta_{o,v}$ corresponding to the residual expansion and the point at which $\omega_k$ is reached, over which there is a non-linear relationship between the angular position $\Theta_i$ of the drive shaft 3 and the angular position $\Theta_o$ of the output shaft 11 due to an expansion of the flexible ring 5c.

Figures 6, 7:
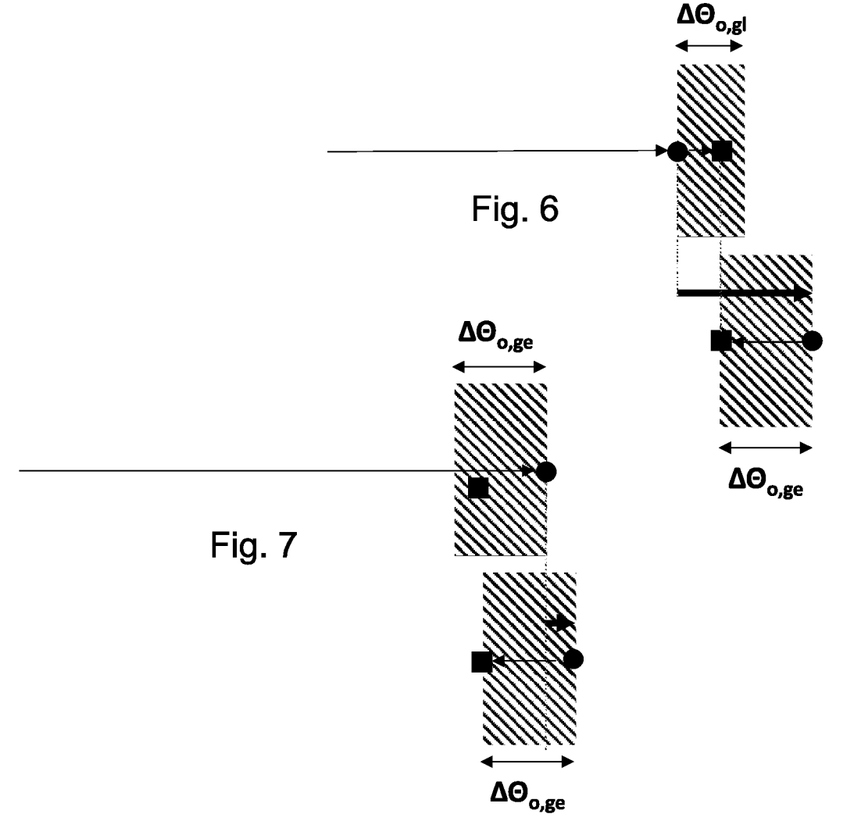
FIG. 6 shows a schematic representation of a positioning method according to the invention for the output shaft when the distance between the actual angular position and the desired angular position is insufficient with codirectional rotation.
FIG. 7 shows a schematic representation of a positioning method according to the invention for the output shaft when the distance between the actual angular position and the desired angular position is insufficient with rotation in the opposite direction.

FIGS. 4 to 7 show positioning methods of the output shaft 11 for different cases depending on whether at least the angular distance $\Delta\Theta_{o,gl}$, $\Delta\Theta_{o,ge}$ of the output shaft 11 lies between the actual angular position and the target angular position (FIGS. 4 and 5) or not (FIGS. 6 and 7). Furthermore, cases are considered depending on whether the target angular position is located in the same direction (FIGS. 4 and 6) or in the opposite direction (FIGS. 5 and 7) as seen from the actual angular position. The actual angular position is shown as a round dot and the target angular position as a square dot.

Figures 4, 5:
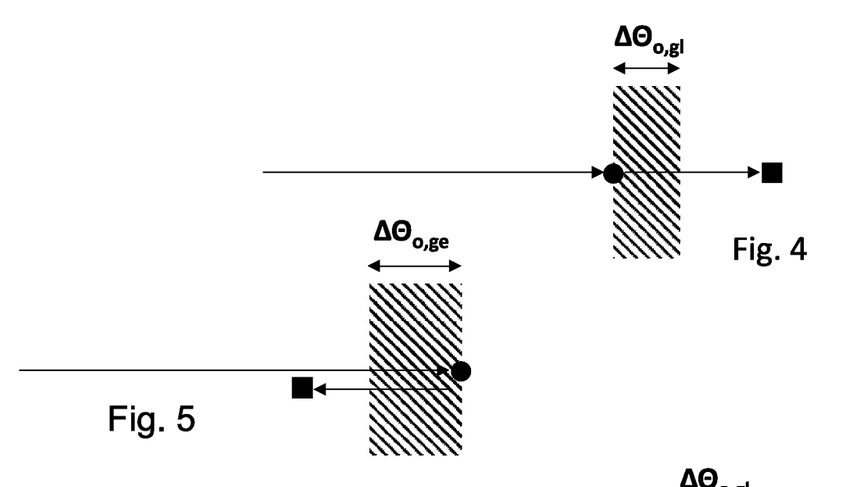
FIG. 4 shows a schematic representation of a positioning method according to the disclosure for the output shaft with a sufficient distance between the actual angular position and the setpoint angular position with codirectional rotation.
FIG. 5 shows a schematic representation of a positioning method according to the disclosure for the output shaft when the distance between the actual angular position and the desired angular position is sufficient with rotation in the opposite direction.

In the case according to FIG. 4, in which the target angular position is rectified to the actual angular position, it is checked whether the actual angular position and the target angular position are spaced apart by at least the rectified angular distance $\Delta\Theta_{o,gl}$ of the output shaft 11. Since it is determined that this is the case, the output shaft 11 is immediately moved to the target angular position.

In the case according to FIG. 5, in which the target angular position is in the opposite direction to the actual angular position, it is checked whether the actual angular position and the target angular position are spaced apart from one another by at least the opposite angular distance $\Delta\Theta_{o,ge}$ of the output shaft 11. Since it is determined that this is the case, the output shaft 11 is immediately moved to the target angular position.

In the case according to FIG. 6, in which the target angular position is rectified to the actual angular position, it is checked whether the actual angular position and the target angular position are spaced apart by at least the rectified angular distance $\Delta\Theta_{o,gl}$ of the output shaft 11. Since it is established that this is not the case, the output shaft 11 is first moved in the codirectional direction of rotation to a new actual angular position which is spaced from the setpoint angular position by at least the opposite angular distance $\Delta\Theta_{o,ge}$ of the output shaft 11. The output shaft 11 is then moved to the desired angular position.

In the case according to FIG. 7, in which the target angular position is in the opposite direction to the actual angular position, it is checked whether the actual angular position and the target angular position are spaced apart from one another by at least the opposite angular distance $\Delta\Theta_{o,ge}$ of the output shaft 11. Since it is established that this is not the case, the output shaft 11 is first moved in the codirectional direction of rotation to a new actual angular position which is spaced apart from the setpoint angular position by at least the opposite angular distance $\Delta\Theta_{o,ge}$ of the output shaft 11. The output shaft 11 is then moved to the desired angular position.

Figure 8:
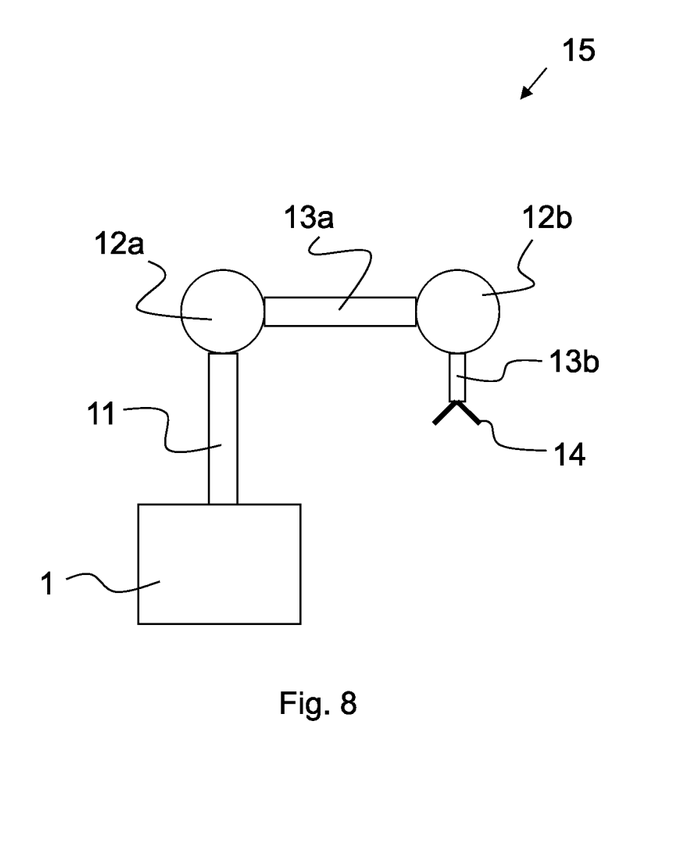
FIG. 8 shows a greatly simplified representation of a robot arm with a drive unit according to the disclosure.

FIG. 8 shows a robot 15 in the form of a robot arm having the drive unit 1 for driving the output shaft 11. A first further shaft 13a and a second further shaft 13b are connected to the drive unit 1 via a first joint 12a and a second joint 12b. By way of example, a gripping tool 14 is arranged on the second further shaft 13b. Further drive devices 1 according to the disclosure can be arranged in the joints 12a, 12b to control the further shafts 12a, 12b in each case.

LIST OF REFERENCE SYMBOLS

1 Drive unit
2 Housing
3 Drive shaft
4 Drive motor
4a Stator
4a Rotor
5 Strain wave gear mechanism
5a Wave generator
5b Ball bearing
5c Flexible ring
5d Gear ring
5e Flexible ring collar
6a First sensor
6b Second sensor
6c Third sensor
6d Sensor part
7 Brake
8 Fixed housing-side component
9 Fixed housing-side component
10a Ball bearing
10b Ball bearing
11 Output shaft
12a First joint 12b Second joint
13a First further shaft
13b Second further shaft
14 Gripping tool
15 Robots
$\Theta_i$ Angular positions of the drive shaft
$\Theta_{i,v}$ Point corresponding to residual expansion
$\Delta\Theta_{i,gl}$ Codirectional angular distance of the drive shaft
$\Delta\Theta_{i,ge}$ Opposing angular distance of the drive shaft
$\Theta_o$ Angular positions of the output shaft
$\Theta_{o,v}$ Point corresponding to residual expansion
$\Delta\Theta_{o,gl}$ Codirectional angular distance of the output shaft
$\Delta\Theta_{o,ge}$ Opposite angular distance of the output shaft
$\omega$ Expansion of the flexible ring
$\omega_{max}$ Maximum expansion of the flexible ring
$\omega k$ Continuous expansion of the flexible ring
T Torque in the flexible ring
$T_{max}$ Maximum torque in the flexible ring
Tk Continuous torque in flexible ring

The invention claimed is:

1. A drive unit for a robot, the drive unit comprising:
a housing;
a drive shaft extending at least partially into the housing;
a drive motor for driving the drive shaft;
a strain wave gear mechanism for transmission from the drive shaft to an output shaft, the strain wave gear mechanism having a wave generator operatively connected to the drive shaft, a flexible ring, and a toothed ring that is connectable to the output shaft, wherein the flexible ring includes a radially extending collar which is fixed to the housing;
a first sensor arranged on the drive shaft, the first sensor is configured for detecting an angular position of the drive shaft;
a second sensor arranged on the toothed ring, the second sensor is configured for detecting an angular position of the output shaft; and
a third sensor arranged on the collar, the third sensor is configured for detecting an expansion of the flexible ring.

2. A robot comprising at least one of the drive units according to claim 1.

3. A method for adjusting an angular position of an output shaft positioned by a drive motor via a drive shaft and a strain wave gear mechanism in of a drive unit, the method comprising:
providing the drive unit having the strain wave gear mechanism for transmission from the drive shaft to the output shaft, the strain wave gear mechanism having a wave generator operatively connected to the drive shaft, a flexible ring including a radially extending collar fixed to a housing of the drive unit, and a toothed ring that is connectable to the output shaft, a first sensor arranged on the drive shaft and configured for detecting an angular position of the drive shaft, a second sensor arranged on the toothed ring and configured for detecting an angular position of the output shaft, and a third sensor arranged on the collar and configured for detecting an expansion of the flexible ring;
using a calibration method for determining angular distances of the drive shaft and the output shaft by the first, the second, and the third sensors at an acceleration over which there is a non-linear relationship between the angular position of the drive shaft and the angular position of the output shaft due to the expansion of the flexible ring; and
using a positioning method and adjusting the angular position of the output shaft from an actual angular position to a target angular position with the second sensor as an actual value generator, and checking whether there is at least the determined angular distance of the output shaft between the actual angular position and the target angular position, and if this is not the case, rotating the output shaft until the actual angular position is spaced apart from the target angular position by at least the determined angular distance of the output shaft, and then adjusting the actual angular position to the target angular position using the second sensor.

4. The method according to claim 3, further comprising, in the calibration process, first, setting the expansion of the flexible ring to 0% and as the first angular positions, the angular position of the drive shaft is detected by the first sensor and the angular position of the output shaft is detected by the second sensor, then accelerating the output shaft in a defined manner in a first direction of rotation to a first speed, wherein the angular position of the drive shaft is detected by the first sensor and the angular position of the output shaft is detected as the second angular positions by the second sensor as soon as the third sensor detects the continuous expansion of the flexible ring; and defining the distance between the first detected angular position and the second detected angular position as codirectional angular distances.

5. The method according to claim 4, further comprising, subsequently, stopping the output shaft and detecting the third angular positions and the angular position of the drive shaft by means of the first sensor and detecting the angular position of the output shaft by the second sensor;
then rotating the output shaft in a second direction of rotation and again stopping the output shaft as soon as the third sensor detects the expansion of the flexible ring of 0%, wherein at rest, the angular position of the drive shaft is detected as the fourth angular positions by the first sensor and the angular position of the output shaft is detected by the second sensor;
then accelerating the output shaft in a defined manner in the second direction, wherein the angular position of the drive shaft is detected by the first sensor and the angular position of the output shaft is detected by the second sensor as the fifth angular positions as soon as the third sensor detects an unchanged expansion of the flexible ring;
and, defining the distance between the third detected angular position and the fifth detected angular position as opposed angular distances.

6. The method according to claim 5, wherein a residual expansion is a difference between the distance between the third detected angular position and the fourth detected angular position of the drive shaft and a distance between the third detected angular position and the fourth detected angular position of the output shaft.

7. The method according to claim 3, wherein in the positioning process, the output shaft is rotated in a same direction of rotation as in an immediately preceding rotation, to space the actual angular position apart by at least the determined angular distance from a setpoint angular position.

8. The method according to claim 7, wherein in the positioning method, when checking the distance between the actual angular position and the target angular position, depending on the direction of rotation in a previous rotation of the output shaft, a codirectional or an opposite angular distance is taken as a basis.

9. A drive unit for a robot, the drive unit comprising:
a drive motor having a drive shaft;
a strain wave gear mechanism having a wave generator connected to the drive shaft, a toothed ring connected to an output shaft, and a flexible ring mounted opposite the wave generator by a ball bearing and between the wave generator and the toothed ring, wherein the flexible ring includes a radially extending collar which is fixed to a housing of the drive unit;
a first sensor for detecting an angular position of the drive shaft;
a second sensor for detecting an angular position of the output shaft; and
a third sensor for detecting an expansion of the flexible ring.

10. The drive unit according to claim 9, wherein the first, second, and third sensors comprise rotary encoders.

11. The drive unit according to claim 9, wherein the flexible ring has a radially extending collar, and the third sensor is arranged on the collar.

12. The drive unit according to claim 9, wherein the second sensor is arranged on the toothed ring.

13. A robot comprising at least one of the drive units according to claim 9.

* * * * *